United States Patent
Lu et al.

(10) Patent No.: US 9,429,688 B2
(45) Date of Patent: Aug. 30, 2016

(54) IMAGE CAPTURING DEVICE HAVING LENS WITH LOW LENS SAG

(71) Applicant: HIMAX TECHNOLOGIES LIMITED, Tainan (TW)

(72) Inventors: Yin-Dong Lu, Tainan (TW); Chuan-Hui Yang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 109 days.

(21) Appl. No.: 14/017,441

(22) Filed: Sep. 4, 2013

(65) Prior Publication Data

US 2015/0062404 A1 Mar. 5, 2015

(51) Int. Cl.
| | |
|---|---|
| *H04N 5/225* | (2006.01) |
| *H04N 5/335* | (2011.01) |
| *G02B 3/08* | (2006.01) |
| *G02B 13/00* | (2006.01) |
| *G02B 5/18* | (2006.01) |
| *G02F 1/1335* | (2006.01) |

(52) U.S. Cl.
CPC .............. *G02B 3/08* (2013.01); *G02B 13/0085* (2013.01); *G02B 5/1876* (2013.01); *G02F 1/133526* (2013.01); *H04N 5/2254* (2013.01)

(58) Field of Classification Search
CPC .... H04N 1/1048; H04N 5/2254; G02B 3/08; G02B 5/1876; G02F 1/133526
USPC .................................................. 348/335, 340
See application file for complete search history.

(56) References Cited

U.S. PATENT DOCUMENTS

| | | | |
|---|---|---|---|
| 2004/0141241 A1* | 7/2004 | Claytor .................... | G02B 3/08 359/742 |
| 2005/0274968 A1* | 12/2005 | Kuo .................. | H01L 27/14621 257/98 |
| 2007/0216851 A1* | 9/2007 | Matsumoto ..................... | 349/200 |
| 2008/0055536 A1* | 3/2008 | Shimozono et al. ......... | 349/200 |
| 2010/0085466 A1* | 4/2010 | Fujimori et al. .............. | 348/340 |

* cited by examiner

*Primary Examiner* — Sinh Tran
*Assistant Examiner* — Selam T Gebriel
(74) *Attorney, Agent, or Firm* — McClure, Qualey & Rodack, LLP

(57) ABSTRACT

An image-capturing lens is disclosed in the disclosure. The image-capturing lens includes a central portion and a periphery portion. The central portion includes a plurality of optical elements arranged in a circular fashion, and each of the optical elements differs in thickness. The periphery portion extends peripherally from the central portion and has a constant thickness. The thickness of the periphery portion is smaller than a thickness of one of the plurality of optical elements that is approximate to the periphery portion.

9 Claims, 9 Drawing Sheets

IMAGE CAPTURING DEVICE HAVING LENS WITH LOW LENS SAG

BACKGROUND OF THE INVENTION

1. Field of the Invention

The invention relates to an optical element and an electrical device using the same, and in particular, relates to an image-capturing lens and an image-capturing device using the same.

2. Description of the Related Art

Miniaturized cameras are widely used in many electronic products, such as mobile phones or personal computers. Mobile phones or personal computers employing image-capturing devices have become popular due to employment of solid-state image capture elements such as CCD (a charged coupled device) type image sensors, CMOS (a complementary metal oxide semiconductor) type image sensors and the like, allowing for higher performance and miniaturization of image-capturing devices.

As advances in semiconductor manufacturing technology will never stop while electronic products are becoming even more compact at the same time, the pixel size of sensors will only become even smaller and the standard for image quality even higher. A conventional lens module, therefore, is not applicable for higher-end lens modules.

BRIEF SUMMARY OF THE INVENTION

One objective of the disclosure is to provide an image-capturing lens with high imaging quality. The other objective of the invention is to provide an image-capturing lens having high structural strength with low lens sag, a distance between a center of a front surface to a bottom surface.

According to some embodiments of the disclosure, an image-capturing lens includes a central portion and a periphery portion extending peripherally from the central portion. The central portion includes a plurality of optical elements arranged in a circular fashion, wherein each of the plurality of optical elements differs in thickness. The periphery portion has a constant thickness, wherein the thickness of the periphery portion is smaller than a thickness of one of the plurality of optical elements that is approximate to the periphery portion.

In some of the above-mentioned embodiments, each of the plurality of optical elements has a first slope and a second slope, and the first slopes are staggered with respect to the second slopes, wherein at least one of the second slopes comprises a curved surface, and at least one of the curved surfaces is formed in an aspherical shape, and has a Fresnel lens configuration.

In some of the above-mentioned embodiments, at least one of the plurality of optical elements has a thickness that is smaller than the thickness of the periphery portion.

Still another objective of the disclosure is to provide a lens module, and according to some embodiments of the disclosure, the lens module includes a first and a second image-capturing lens, which are arranged in the same optical axis. The first image-capturing lens includes a first central portion including a plurality of first optical elements arranged in a circular fashion, wherein each of the plurality of first optical elements differs in thickness; and a first periphery portion extending peripherally from the first central portion and having a constant thickness, wherein the thickness of the first periphery portion is smaller than a thickness of one of the plurality of first optical elements that is approximate to the first periphery portion.

In some of the above-mentioned embodiments, the second image-capturing lens includes a second central portion having varying thicknesses, and a second periphery portion extending peripherally from the second central portion and has a constant thickness, wherein a width of the first central portion is larger than a width of the second central portion.

In some of the above-mentioned embodiments, the first image-capturing lens and the second image-capturing lens are arranged in order from an image side to an object side of the lens module, and the first optical elements are adjacent to the image side.

In some of the above-mentioned embodiments, each of the plurality of optical elements has a first slope and a second slope, and the first slopes are staggered with respect to the second slopes, wherein at least one of the second slopes comprises a curved surface. In addition, at least one of the curved surfaces is formed in an aspherical shape, and has a Fresnel lens configuration.

In some of the above-mentioned embodiments, at least one of the plurality of first optical elements has a thickness that is smaller than the thickness of the first periphery portion.

Yet still another objective of the disclosure is to provide an image-capturing device, and according to some embodiments of the disclosure, the image-capturing device includes a lens module including a Fresnel lens, and an image sensor for receiving light passing through the Fresnel lens.

In some of the above-mentioned embodiments, the Fresnel lens is adjacent to the image sensor.

In some of the above-mentioned embodiments, the lens module includes: a first image-capturing lens including a first and a second image-capturing lens, which are arranged in the same optical axis. The first image-capturing lens includes a first central portion, wherein the Fresnel lens is formed on the central portion; and a first periphery portion extending peripherally from the first central portion and has a constant thickness, wherein a minimum thickness of the first central portion is smaller than the thickness of the first periphery portion. The second image-capturing lens includes a second central portion having varying thicknesses; and a second periphery portion extending peripherally from the second central portion and has a constant thickness, wherein a width of the first central portion is larger than a width of the second central portion.

In some of the above-mentioned embodiments, the Fresnel lens includes a curved surface which is formed in an aspherical shape.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
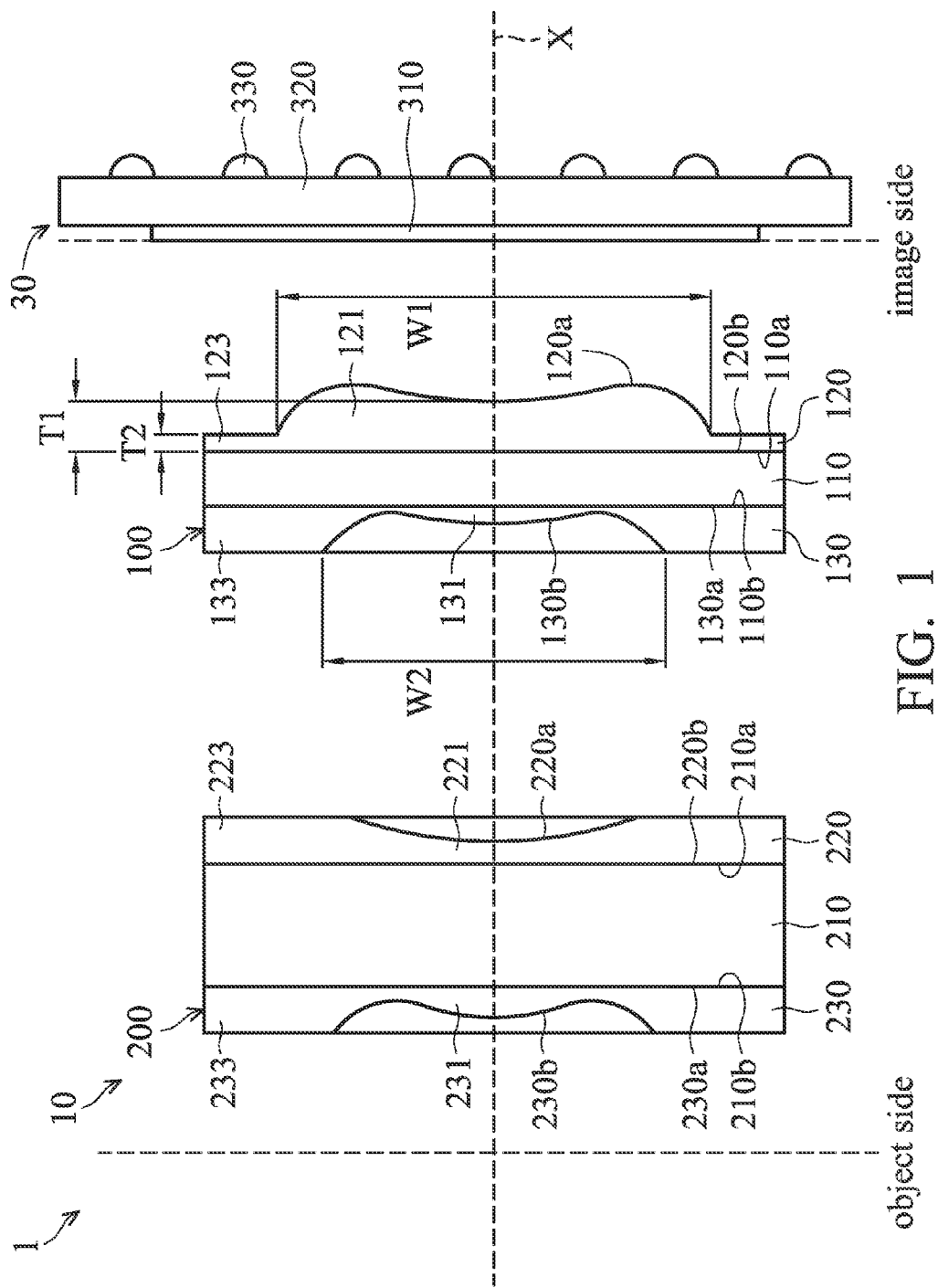
FIG. 1 shows a cross-sectional view of an image-capturing device in accordance with some embodiments of the disclosure.

Referring to FIG. 1, in some embodiments of the present disclosure, the image-capturing device 1 includes a lens module 10 and an image sensor unit 30. The lens module 10 includes a first lens group 100 and a second lens group 200.

The first lens group 100 is positioned between an image side and the second lens group 200, and is composed by a complex lens. The complex lens includes a first base lens 110, a first image-capturing lens 120 and a second image-capturing lens 130 arranged in an optical axis X. In an exemplary embodiment of the invention, the complex lens is formed by a plurality of lenses connected to each other, and a refractive index of at least one of the lenses is different from the refractive indexes of the other lenses. For example, the first image-capturing lens 120 has a refractive index that is different to that of the first base lens 110 and the third lend 130.

In detail, in the present embodiment, the first base lens 110 is, for example, a transparent flat panel of a glass material, where a plane 110*a* thereof facing to the image side is adhered to an object side surface 120*b* of the first image-capturing lens 120, and a plane 110*b* thereof facing to the object side is adhered to an image side surface 130*a* of the second image-capturing lens 130.

The first image-capturing lens 120 is a plano-convex lens and includes a central portion 121 and a periphery portion 123 extending peripherally from the central portion 121. The central portion 121 has varying thicknesses, and the periphery portion 123 has a constant thickness. In the embodiment, the center of the central portion 121 has a thickness of T1 and the periphery portion 123 has a thickness of T2, wherein the thickness T2 is smaller than the thickness T1. Moreover, a part of the image side surface 120*a* of the first image-capturing lens 120 that corresponds to the central portion 121 is a convex surface formed in an aspherical shape, and the other part of the image side surface 120*a* of the first image-capturing lens 120 that corresponds to the periphery portion 123 is a flat surface.

The second image-capturing lens 130 is a plano-concave lens and includes a central portion 131 and a periphery portion 133 extending peripherally from the central portion 131. The central portion 131 has varying thicknesses, and the periphery portion 133 has a constant thickness. Moreover, a part of the object side surface 130*b* of the second image-capturing lens 130 that corresponds to the central portion 131 is a concave surface formed in an aspherical shape, and the other part of the object side surface 130*b* of the second image-capturing lens 130 that corresponds to the periphery portion 133 is a flat surface. Noted that, in the embodiment, the a width W1 of the central portion 121 of the first image-capturing lens 120 is larger than a width W2 of the central portion 131 of the second image-capturing lens 130 so as to facilitate delivering light from the object side to the image sensor unit 30.

The second lens group 200 is positioned between the object side and the first lens group 100. Similarly to the first lens group 100, the second lens group 200 is composed by a complex lens, and the complex lens includes a second base lens 210, a third image-capturing lens 220 and a fourth image-capturing lens 230. The third image-capturing lens 220 has a refractive index that is different to that of the second base lens 210 and the fourth image-capturing lens 230.

In detail, in the present embodiment, the second base lens 210 is, for example, a transparent flat panel of a glass material, wherein a plane 210*a* thereof facing to the image side is adhered to an object side surface 220*b* of the third image-capturing lens 220, and a plane 210*b* thereof facing to the object side is adhered to an image side surface 230*a* of the fourth image-capturing lens 230.

The third image-capturing lens 220 is a plano-concave lens and includes a central portion 221 and a periphery portion 223 extending peripherally from the central portion 221. The central portion 221 has varying thicknesses, and the periphery portion 223 has a constant thickness. Moreover, a part of the image side surface 220*a* of the third image-capturing lens 220 that corresponds to the central portion 221 is a concave surface formed in a spherical shape, and the other part of the image side surface 220*a* of the third image-capturing lens 220 that corresponds to the periphery portion 223 is a flat surface.

The fourth image-capturing lens 230 is a plano-concave lens and includes a central portion 231 and a periphery portion 233 extending peripherally from the central portion 231. The central portion 231 has varying thicknesses, and the periphery portion 233 has a constant thickness. Moreover, a part of the object side surface 230*b* of the fourth image-capturing lens 230 that corresponds to the central portion 231 is a concave surface formed in an aspherical shape, and the other part of the object side surface 230*b* of the fourth image-capturing lens 230 that corresponds to the periphery portion 233 is a flat surface.

The image sensor unit 30, for example, is a complementary metal oxide semiconductor (CMOS) sensor. The image sensor unit 30 includes an image sensor chips 310 facing the image side surface 120*a* of the first image-capturing lens 120, and a substrate 320 on which the image sensor chips is mounted. The bottom surface of the substrate 320 is provided with a plurality of connection member 330 so as to be connected to a terminal of a main board.

Figure 2A:
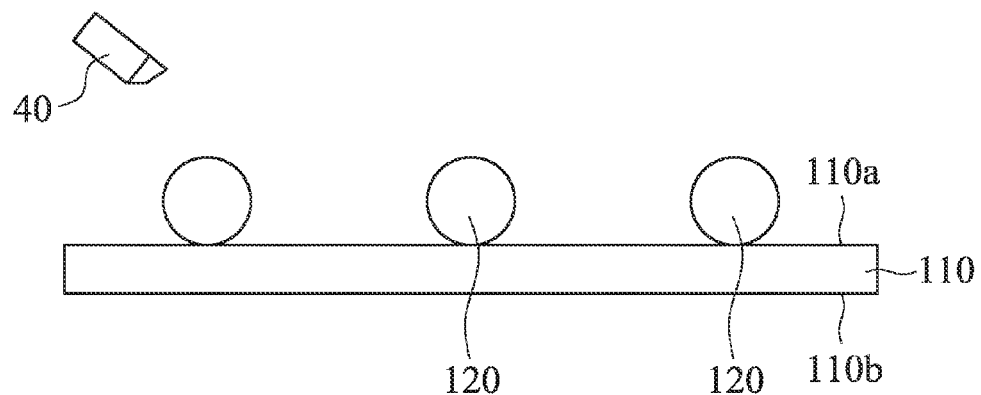
FIGS. 2A-2H show the structure and the manufacturing method of the lens module 10 according to one embodiment of the present invention.
Figure 2B:
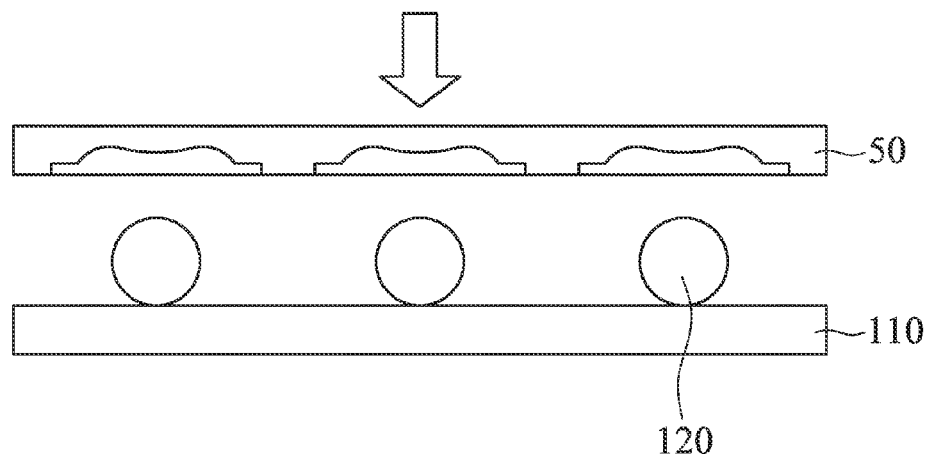
Figure 2C:
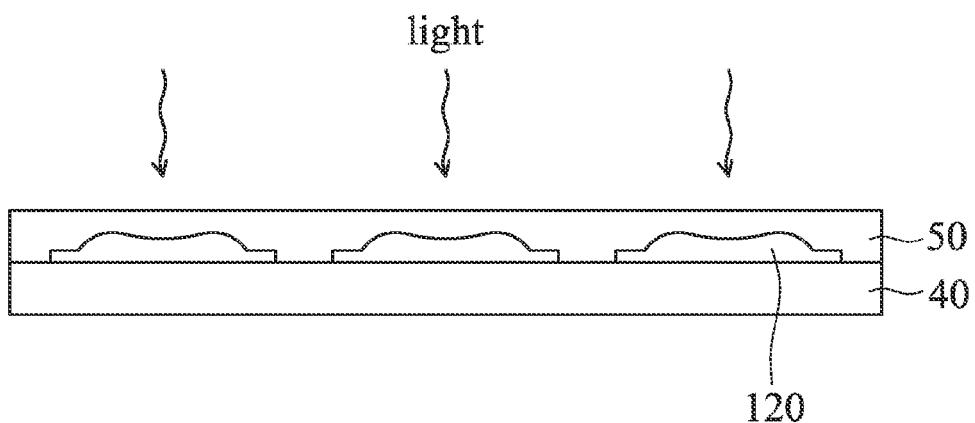
Figure 2D:
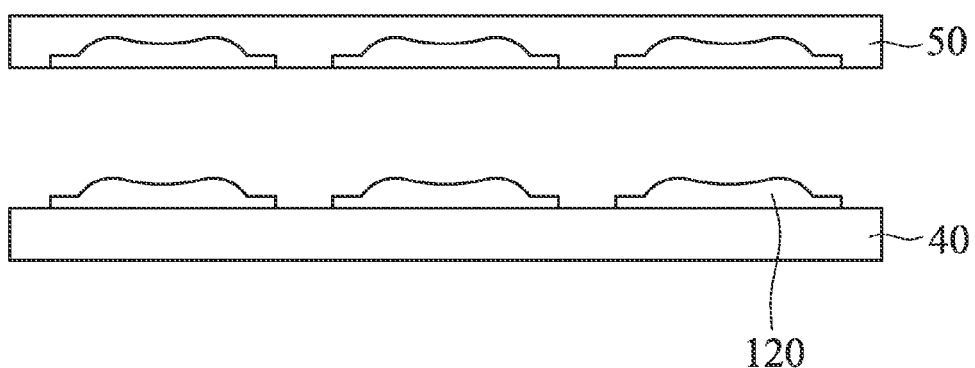

Referring to FIGS. 2A-2H, which show the structure and the manufacturing method of the lens module 10 according to one embodiment of the present invention. In FIG. 2A, a glass substrate 110 having a first surface 110*a* and a second surface 110*b* opposite to the first surface 110*a* is provided. After that, a polymer glue 120 is disposed on different regions on the first surface 110*a* of the glass substrate 110 and is shaped to be plano-convex lenses 120 by the lens mould 50 as shown in FIG. 2B. Then in FIG. 2C, the shaped polymer glue is solidified to form the rigid plano-convex lenses 120 by exposing the shaped polymer glue to light e.g. ultraviolet (UV) rays, and the lens mould 50 is moved away after the polymer glue is solidified to form the plano-convex lenses 120 as shown in FIG. 2D.

Figure 2E:
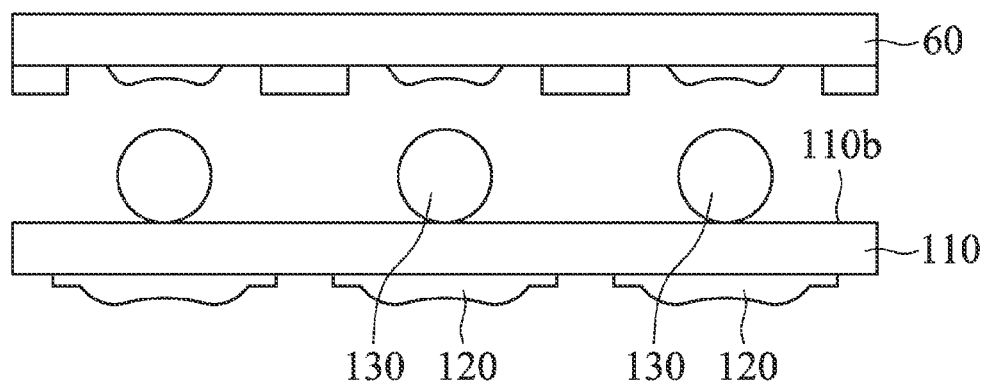
Figure 2F:
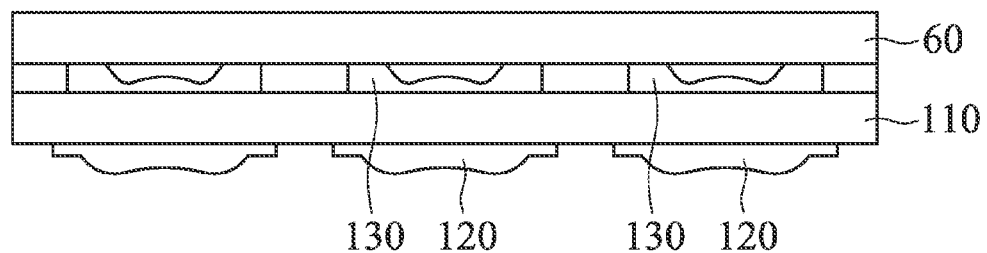
Figure 2G:
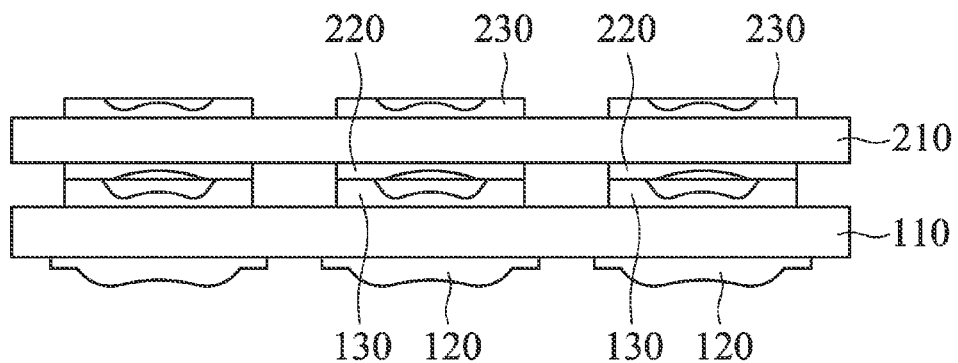
Figure 2H:
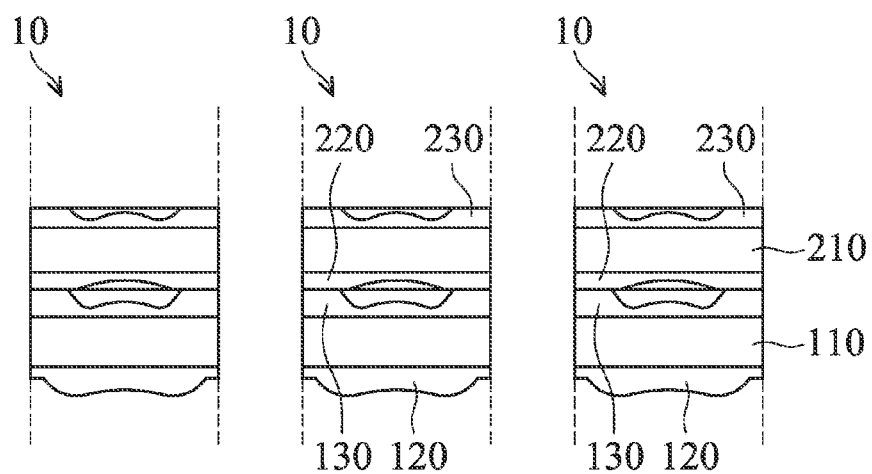

After the plano-convex lenses 120 are formed, the polymer glue is once again disposed on separated regions on the second surface 110*b* of the glass substrate 110 as shown in FIG. 2E. Next, the polymer glue on the second surface 110*b* is shaped to be plano-concave lenses 130 with another type of lens mould 60, and is solidified to form the plano-concave lenses 130 as shown in FIG. 2F. Continuing to FIG. 2G, another glass substrate 210 formed with plano-concave lenses 220 and plano-concave lenses 230 manufactured by the similar processes as mentioned above is staked on the plano-concave lenses 130. In some embodiments, adhesive material may be applied on the concave lenses 130 or/and the concave lenses 220 and the first lens group 100 is connected to the second lens group via the adhesive material, thereby enhancing the structural strength of the lens module 10. Then in FIG. 2H, the staked glass substrates 110 and 210 and lenses 120, 130, 220, and 230 are cut into a plurality of individual lens modules 10 as shown in FIG. 2H.

It should be note that the manufacturing method of the lens module 10 should not be limited to the above-mentioned embodiment. The first lens group 100 and the second lens group 200 of the lens module 10 may be formed by the other methods. For example, in some embodiments, the first lens group 100 and the second lens group 200 may be designed and manufactured using a 3D printing prototyping method or injection molding method. Therefore the complex lens of the first lens group 100 and the second lens group 200 are integrally formed.

Through the arrangement where the thickness T2 of the periphery portion 123 of the first image-capturing lens 120 which faces the image sensor unit 30 is smaller than a thickness T1 of the central portion 121, the image-capturing device 1 of the present disclosure has a good imaging quality while maintaining a miniaturized size.

Figure 3:
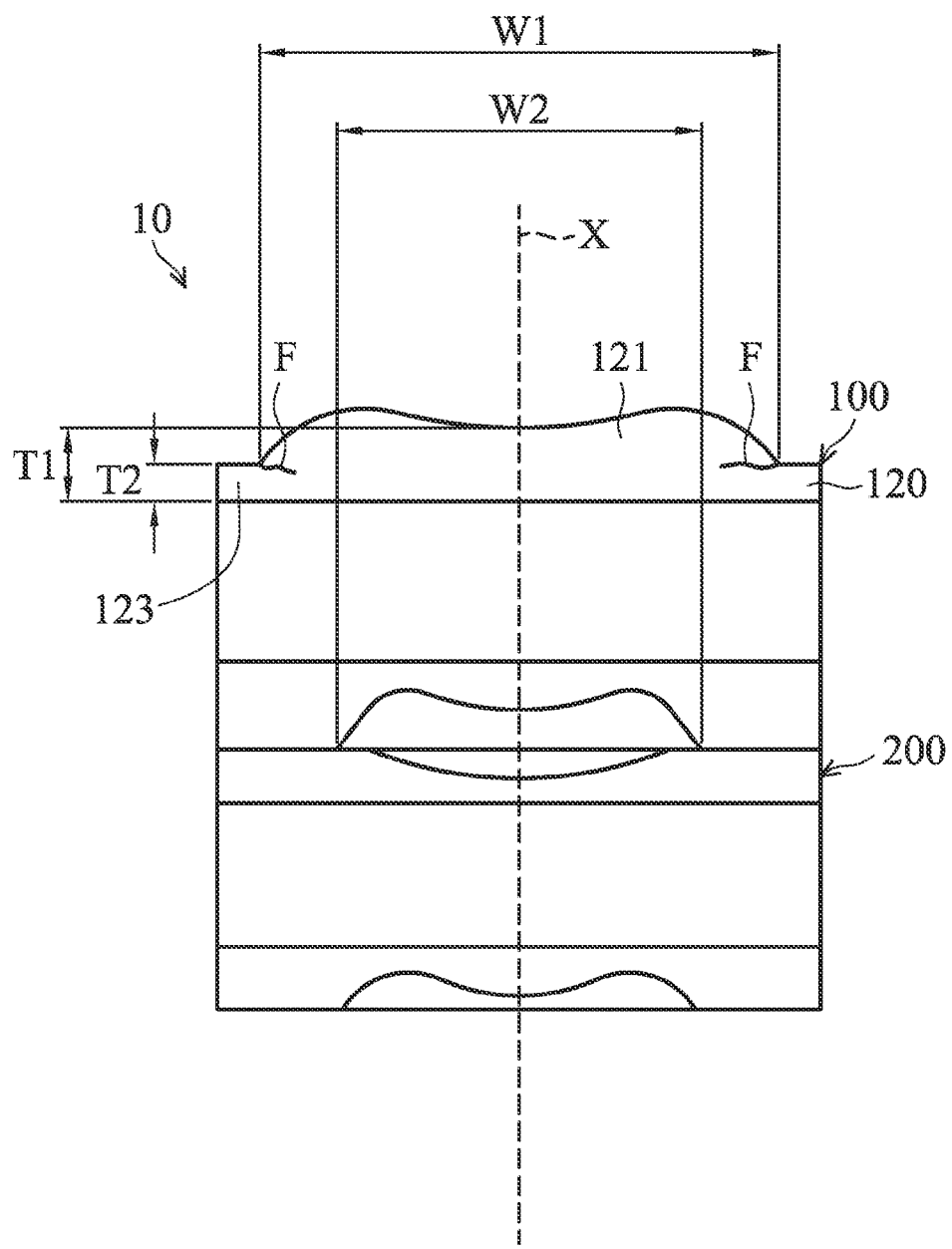
FIG. 3 shows a lens module having a fracture due to stress concentration.

However, as shown in FIG. 3, due to the fact that the width W1 of the central portion 121 of the first image-capturing lens 120 is larger than the width W2 of the central portion 131 of the second image-capturing lens 130, namely a larger volume of the central portion 121, and the boundary of the central portion 121 and the periphery portion 123 has thickness difference, cracking or like defects may occur at positions designated as F due to stress concentration in reliability tests (such as temperature cycles), and thus leads to a reduction of reliability.

Figure 4:
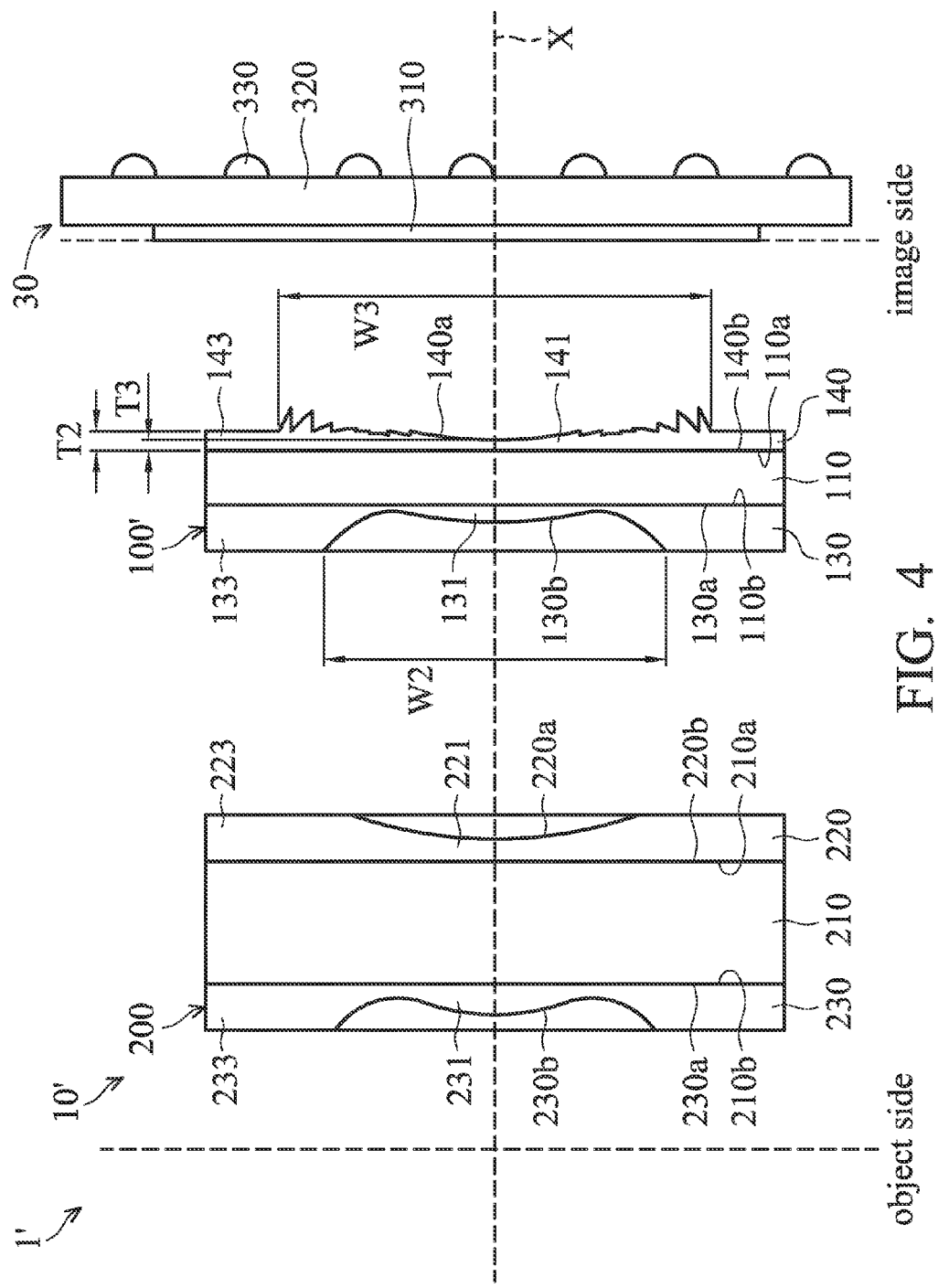
FIG. 4 shows a cross-sectional view of an image-capturing device in accordance with some embodiments of the disclosure.

Therefore, another embodiment is provided based on the features of the embodiments shown in FIG. 1 and the aforesaid observations. Referring to FIG. 4, which shows cross-sectional view of an image-capturing device 1' in accordance with some embodiments of the disclosure, in which elements which are similar with that of the image-capturing device shown in FIG. 1 are provided with the same reference numbers, thus, the features thereof are not reiterated in the interest of brevity. In the embodiment, the first lens group 100' includes a first base lens 110, a first image-capturing lens 140, and a second image-capturing lens 130 arranged in the same optical axis X, wherein a plane 110a of the first base lens 110 facing to the image side is adhered to an object side surface 140b of the first image-capturing lens 140, and a plane 110b thereof facing to the object side is adhered to an image side surface 130a of the second image-capturing lens 130.

Figure 5:
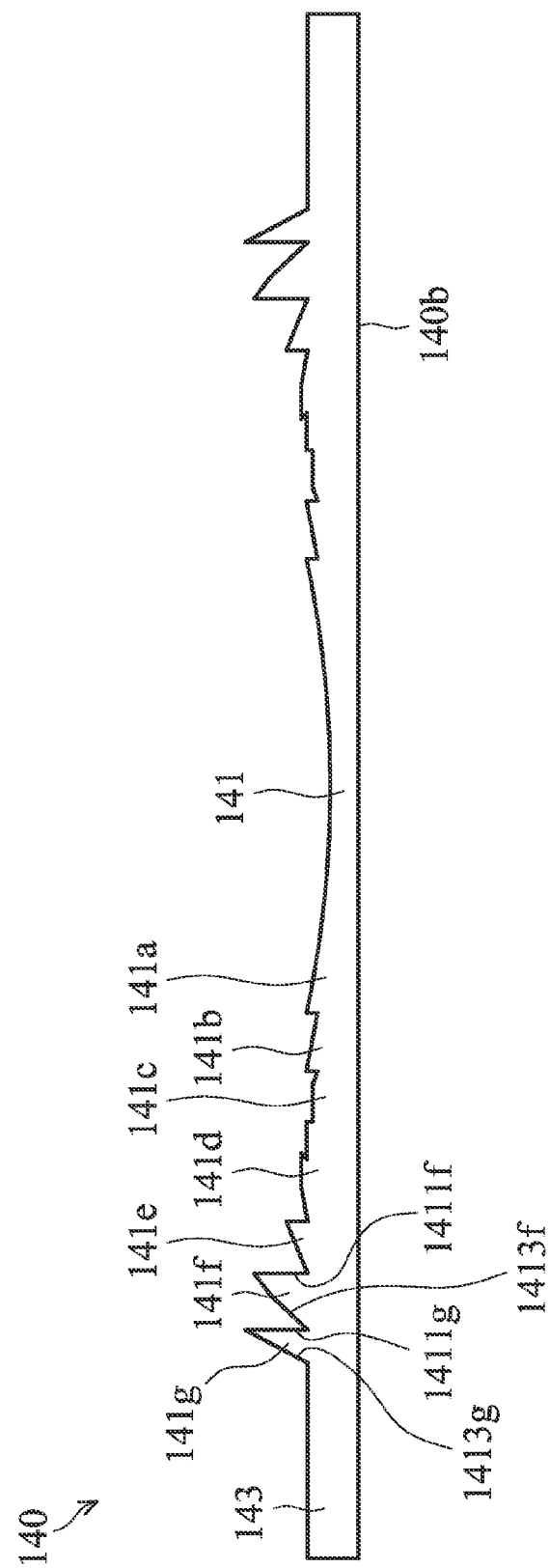
FIG. 5 shows an image-capturing lens of the image-capturing device shown in FIG. 4.

Referring to FIG. 5, the structural features of the first image-capturing lens 140 is elaborated hereinafter. The first image-capturing lens 140 has a central portion 141 and a periphery portion 143 extending peripherally from the central portion 141. The central portion 141 has a width W3 larger than that of the central portion 131 and includes a plurality of optical elements (i.e. optical elements 141a, 141b, 141c, 141d, 141e, 141f, and 141g) arranged in a circular fashion, wherein each of the plurality of optical elements 141a-141f differs in thickness.

Specifically, the central portion 141 is a multi-segment lens, such as a Fresnel lens, that has approximately the same refractive power as the plano-convex lens 120 (FIG. 1).

From a cross-section, each optical elements 141a-141f forms a ridge above the object side surface 140b of the central portion 141, and each ridge has a first slope on one side and a second slope on the opposite side. For example, the optical element 141g has a second slope 1413g on one side which is connected to the surface of the periphery portion 143 and a first slope 1411g on the opposite side, wherein the second slope 1413g and the first slope 1411g meet at the apex of the ridge.

In addition, each pair of adjacent optical elements 141a-141f forms a groove or valley above the planar side surface 140b of the central portion 141, wherein the second slope of one optical element meets the first slope of the adjacent ridge at the bottom corner of the groove or valley, and are arranged such that, for example, the first slopes 1411f and 1411g are staggered with respect to the second slopes 1413f and 1413g. In the embodiment, the second slopes of the optical elements 141a-141f are curved surfaces which mimic the refractive property of a corresponding portion of the central portion 121 of the first image-capturing lens 120 (FIG. 1). Thus, the second slopes of the optical elements 141a-141f have an aspherical shape as the part of the image side surface 120a corresponding to the central portion 121.

Since the optical elements 141a-141f are brought closer to the object side surface 140b of the central portion 141 (i.e. decrease lens sag), wherein a minimum thickness T3 of the first central portion 141 is smaller than the thickness T2 of the first periphery portion, the overall thickness and volume of the central portion 141 is reduced significantly in comparison with the central portion 121. While a difference in thickness still exists between the periphery portion 143 and the approximate optical element 141g, the cracking or other defects, occurring in boundaries therebetween, due to stress concentration, can be prevented.

Figure 6:
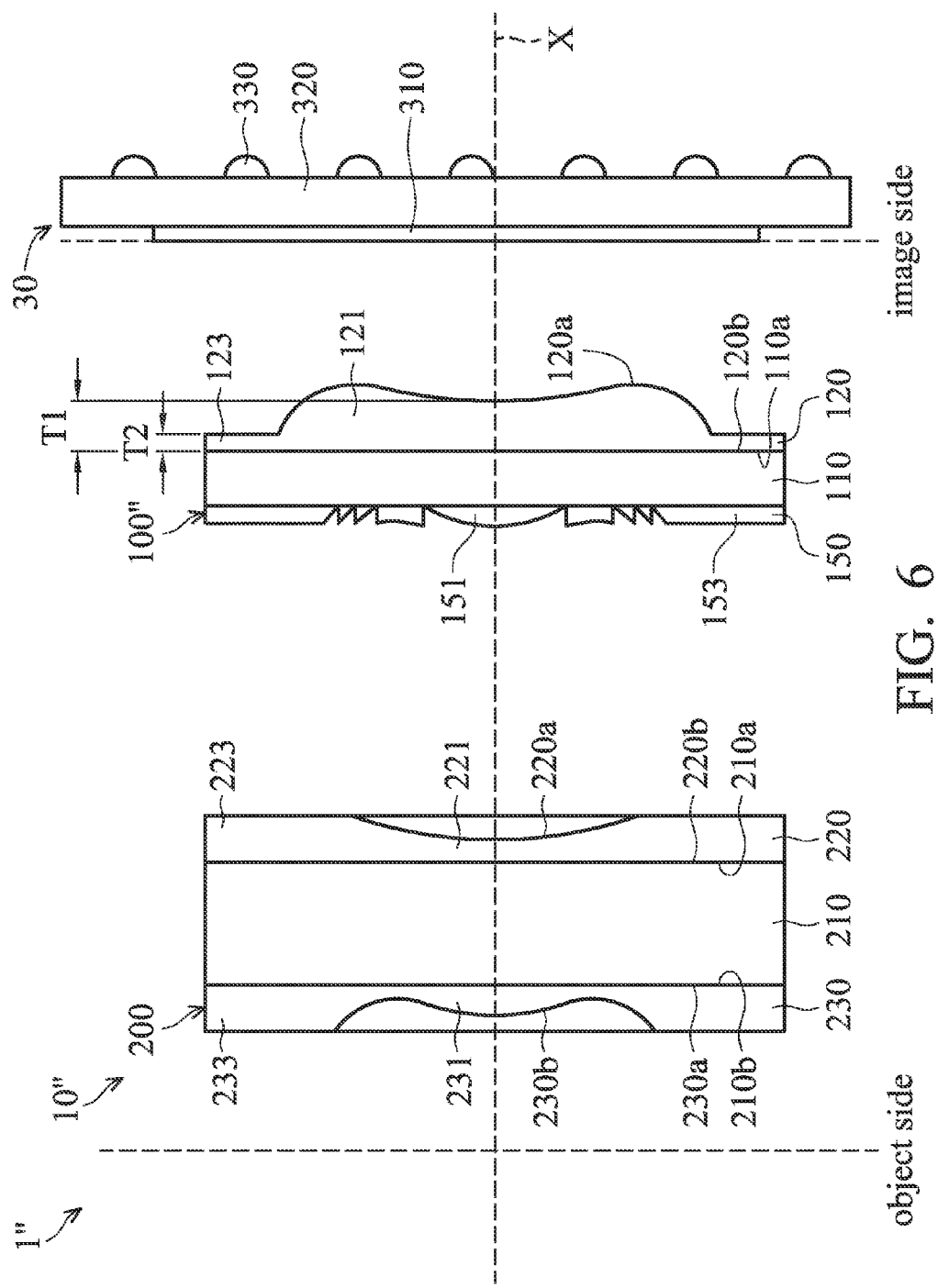
FIG. 6 shows a cross-sectional view of an image-capturing device in accordance with some embodiments of the disclosure.

In some other embodiments, the other lenses of the lens module 10 (FIG. 1) can be modified to be a multi-segment lens. For example, referring to FIG. 6, a cross-sectional view of an image-capturing device 1" in accordance with some embodiments of the disclosure is shown, in which elements which are similar with that of the image-capturing device shown in FIG. 1 are provided with the same reference numbers, thus, the features thereof are not reiterated in the interest of brevity. In the embodiment, the first lens group 100" includes a first base lens 110, a first image-capturing lens 120, and a second image-capturing lens 150 arranged in the same optical axis X, wherein a central portion 151 of a second image-capturing lens 150 is a multi-segment lens, such as a Fresnel lens, thereby decreasing the thickness of the second image-capturing lens and enhancing the structural strength thereof.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
  a first image-capturing lens comprising:
    a first central portion comprising a plurality of first optical elements arranged in a circular fashion, wherein each of the plurality of first optical elements differs in thickness; and
    a first periphery portion extending peripherally from the first central portion and having a constant thickness, wherein the thickness of the first periphery portion is smaller than a thickness of one of the plurality of first optical elements that is approximate to the first periphery portion; and a second image-capturing lens, wherein the first and second image-capturing lenses are arranged in the same optical axis;

wherein the first image-capturing lens and the second image-capturing lens are arranged in order from an image side to an object side of the lens module, and the first optical elements are adjacent to the image side;

wherein the second image-capturing lens comprises:

a second central portion having varying thicknesses; and a second periphery portion extending peripherally from the second central portion and having a constant thickness, wherein a width of the first central portion is larger than a width of the second central portion.

2. The lens module as claimed in claim 1, wherein each of the plurality of optical elements has a first slope and a second slope, wherein the first slopes are staggered with respect to the second slopes, and at least one of the second slopes comprises a curved surface.

3. The lens module as claimed in claim 2, wherein at least one of the curved surfaces is formed in an aspherical shape.

4. The lens module as claimed in claim 1, wherein at least one of the plurality of first optical elements has a thickness that is smaller than the thickness of the first periphery portion.

5. The lens module as claimed in claim 1, wherein the first central portion of the first image-capturing lens comprises a Fresnel lens.

6. An image-capturing device, comprising
a lens module comprising a plurality of image-capturing lenses; and
an image sensor for receiving light passing through the lens module, wherein a first image-capturing lens of the image-capturing lenses which is closest to the image sensor comprises a Fresnel lens;

the first image-capturing lens comprising:

a first central portion, wherein the Fresnel lens is formed on the central portion; and a first periphery portion extending peripherally from the first central portion and having a constant thickness; and the others of the image-capturing lenses of the lens module comprises:

a second image-capturing lens comprising:

a second central portion having varying thicknesses; and a second periphery portion extending peripherally from the second central portion and having a constant thickness, wherein a width of the first central portion is larger than a width of the second central portion, wherein the first and second image-capturing lenses are arranged in the same optical axis.

7. The image-capturing device as claimed in claim 6, wherein a minimum thickness of the first central portion is smaller than the thickness of the first periphery portion.

8. The image-capturing device as claimed in claim 6, wherein the Fresnel lens comprises a curved surface which is formed in an aspherical shape.

9. A lens module, comprising:

a plurality of image-capturing lenses arranged along an optical from an object side to an image side;

wherein a first image-capturing lens of the image-capturing lenses which is closest to the image side comprises:

a first central portion, comprising a Fresnel lens; and a first periphery portion extending peripherally from the first central portion and having a constant thickness;

wherein a second image-capturing lens of the image-capturing lenses comprising:

a second central portion having varying thicknesses; and a second periphery portion extending peripherally from the second central portion and having a constant thickness, wherein a width of the first central portion is larger than a width of the second central portion.

* * * * *